July 19, 1938.　　　　　H. D. RIDGE　　　　　2,124,357
SCALE AND INDICATOR OPERATING MEANS THEREFOR
Filed Aug. 22, 1936　　　2 Sheets-Sheet 1

INVENTOR
Herman D. Ridge
BY
Hoguet, Neary & Campbell
ATTORNEYS

July 19, 1938.  H. D. RIDGE  2,124,357
SCALE AND INDICATOR OPERATING MEANS THEREFOR
Filed Aug. 22, 1936  2 Sheets-Sheet 2
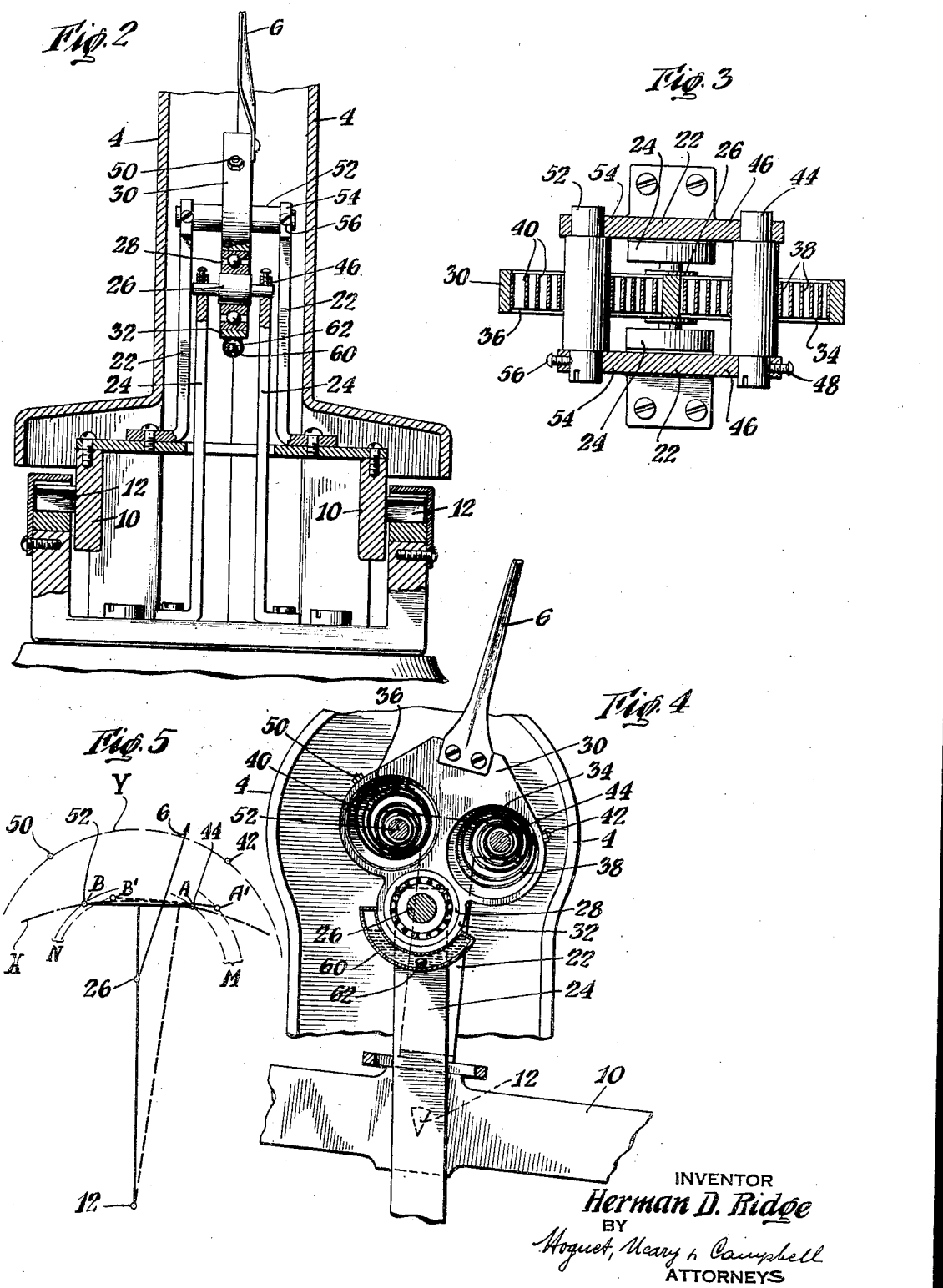
INVENTOR
Herman D. Ridge
BY
Hoguet, Neary & Campbell
ATTORNEYS Patented July 19, 1938

2,124,357

UNITED STATES PATENT OFFICE 2,124,357

SCALE AND INDICATOR OPERATING MEANS THEREFOR

Herman D. Ridge, Scarsdale, N. Y., assignor to Toledo Scale Manufacturing Company, Toledo, Ohio, a corporation of New Jersey Application August 22, 1936, Serial No. 97,334

17 Claims. (Cl. 265—59)

This invention relates to weighing devices and similar other mechanism embodying a relatively movable pointer and scale and is directed particularly to operating means for moving the pointer with respect to the scale.

Weighing devices such as overweight-underweight scales are ordinarily provided with a pointer which is urged toward a central or zero position by springs, weights or the like, but is movable to one side or the other from its central position to indicate overweight or underweight. The pointer is moved in response to movement of a lever which is usually provided with platters or pans on opposite sides of a bearing, and is connected to the lever by links, springs, flexible bands or the like.

In scales of this type where the movement of the lever and the scale pans required to cause the indicator to move through a sufficient arc to give the desired indication on the scale is comparatively great, when a heavy weight, say five pounds, is in position on one of the scale pans and a filled package is removed from the other, the weight drops through a relatively long distance, jarring the mechanism severely and causing injury to the knife edges or supports for the moving elements of the scale. Also, where the movement of the object and counterbalancing load is comparatively great, the time required for such movement to take place is so great as to result in a slowly acting scale. Moreover, the links and other means employed for actuating the pointer, frequently have made it necessary to employ a tower for housing the pointer and operating elements which is unnecessarily tall. If the links were connected to the lever at points spaced a sufficient distance from the lever bearing to give the pointer adequate travel the width of the tower and the spacing of the scale pans would be objectionable. In some constructions using springs the actuating means urges the knife edge supporting the pointer against its block or support with such force as to cause undue wear of the parts and to diminish the sensitivity of the instrument. In other constructions using links for actuating the pointer it is difficult to hold the knife edge in position on its support.

The graduations on some scales are unequal in length, due to the characteristics of the operating means employed. It has also been usual in prior constructions to have one or more elements secured to the tower cover so that the cover cannot be removed without disassembling the mechanism or throwing the scale out of adjustment.

In accordance with the present invention, these objections to constructions of the prior art are overcome and an accurate, sensitive scale or instrument provided by the use of novel actuating means for the movable elements of the indicator. The construction is compact and economical to produce and free from excessive strains or wear of the movable parts.

In that form of the invention hereinafter described, the mechanism embodies opposed resisting members which tend to maintain a pointer in a central or zero position without imposing harmful strain on the bearing therefor or permitting displacement of the parts.

One of the objects of the present invention is to provide a novel type of overweight-underweight scale in which the movement of the scale pans or platters is relatively small as compared with the movement of the indicator.

A further object of the invention is to provide an overweight-underweight scale with an indicator having convenient adjustable means to secure a wide range of automatic capacity or the desired length of movement thereof upon movement of the scale pans under definite variations of load.

Another object of the invention is to provide a scale which is small and compact and which does not require either a tall tower or extended width to insure sufficiently multiplied movement of the indicator and sensitive operation thereof.

Another object of the invention is to provide a new and improved indicator operating means adapted for use on scales which does not change due to positioning thereof out of level.

A further object of the invention is to provide a scale in which there are no loose connections or links in which lost motion may develop and which does not require frequent repair and adjustment.

Another object of the invention is to provide novel operating means for an indicator of general application and adapted for use on either weighing devices or other mechanism.

These and other objects and features of the invention will appear from the following description thereof in which reference is made to the accompanying figures of the drawings:

Figure 2 is a vertical sectional view of the construction of Figure 1 taken on the line 2—2 thereof;

Figure 3 is a horizontal sectional view taken on the line 3—3 of Figure 1 looking downward;

Figure 4 is a vertical sectional view through the tower of the overweight-underweight scale of Figure 1 with the indicator displaced from its zero position, and Figure 5 is a diagrammatic figure indicating the nature of the movements of the pointer and operating means therefor.

Figure 1:
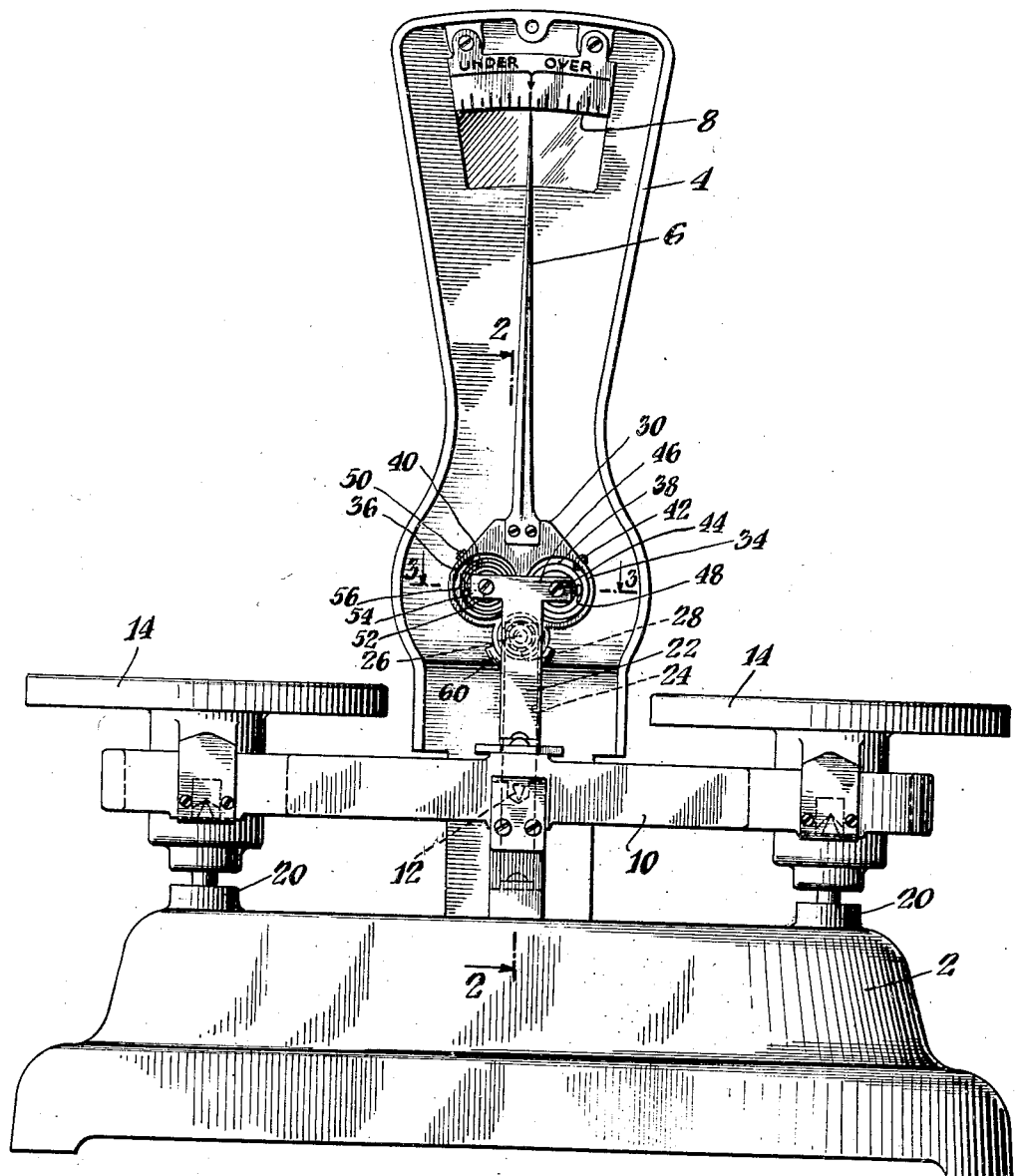
Figure 1 is an elevation of a typical weighing device embodying the present invention with the tower cover removed to show the indicator operating mechanism.

The invention as herein shown and described for purposes of illustration is applied to an overweight-underweight scale embodying a base 2 on which is mounted a tower cover 4 within which is located a pointer 6 movable over a chart 8 carried by the cover 4 and graduated as desired to indicate overweight and underweight. A lever 10 is pivotally supported on knife edges 12 or other bearings carried by the base member and is provided with pans or platters 14 for receiving weights and the articles to be weighed. Suitable means such as the usual check lever may be located within the base of the scale to cause the pans 14 to move without tilting and a dash pot may be provided to dampen the movement of the lever but such elements are well known and therefore are not shown.

Abutments 20 formed on the base serve to limit the downward movement of the lever and scale pans on either side of the lever support and these abutments in the present construction may be positioned relatively close to the pan supports since the movement of the pans and lever required to produce the desired indication on the scale may be comparatively small.

The indicator operating means of the present invention as shown in Figures 1 to 4 embodies arms 22 secured to the lever 10 and extending vertically therefrom near the front and back of the tower so as to be moved with the lever about the pivots 12 by which the lever is supported. Supports 24 extending vertically from the base member 2 are provided with a bearing 26 about which the pointer 6 may move. The bearing employed may be of any suitable character such as a knife edge, pin, or the like, but as shown is in the form of a pin 26 about which ball bearings 28 are positioned and a pointer carrying member 30 is provided having a lower portion 32 presenting a ball race over which the balls about bearing 26 move.

The pointer carrying member 30 is provided with openings 34 and 36 located on opposite sides of the support 26. As shown these openings may be positioned above the support within which are located oppositely wound spiral springs 38 and 40 respectively or other suitable spring means. One end of the spring 38 is secured to the member 30 by means of a screw 42 or the like, while the opposite end of the spring is secured to a pin 44 carried by laterally extending portions 46 on the upper ends of the arms 22. The pin 44 is rotatably mounted in the portions 46 of the arms 22, but is normally held in fixed position by means of a set screw 48 or other retaining means.

In a like manner, spring 40 is secured to the member 30 by means of a screw 50 or the like and its inner end secured to a pin 52 mounted in the laterally extending portions 54 of the arms 22, the pin 52 being held in fixed position with respect to the portions 54 by means of a set screw 56, or the like. The pointer 6 is attached to the member 30 and is movable therewith about the bearing 26 by movement of the arms 22 in response to the movement of the lever 10 to which the arms 22 are secured.

The springs 38 and 40 as shown in the drawings are preferably of the spirally coiled type and are wound in opposite directions and in opposed relation so that on movement of the pointer to one side or the other, the spring on that side toward which the pointer is moved is tensioned in one direction, say to unwind, whereas the spring on the opposite side of the support 26 is tensioned in the opposite direction, say to wind up. The pins 44 and 52 carried by the arms 22 and to which one end of the springs is secured, move through an arc about the support 12 for the lever 10, as indicated diagrammatically by the dotted line $x$ of Figure 5, whereas the springs 38 and 40 are secured to the member 30 by screws 42 and 50 at points which move in an arc about the bearing 26 as indicated by the line Y of Figure 5.

On movement of the lever 10 and arms 22 from the position of Fig. 1 to that of Fig. 4, the pins 44 and 52 move to the right (Fig. 5) from the positions A and B to the position A' and B'. The distance which the pin 44 moves with respect to the bearing 26 in moving from the point A to A' is represented by the radial distance M between arcs drawn through this point with bearing 26 as a center. Similarly the distance which the pin 52 travels with respect to the bearing 26 is represented by the radial distance N between arcs drawn through the points B and B' with the bearing 26 as a center.

The distance M is greater than the distance N and therefore the movement of the arms 22 and pins 44 and 52 to the right causes the spring 38 to be tensioned more than spring 40. However, since the member 30 carrying the pointer 6 is free to move about the bearing 26, the springs M and N operate to equalize the tension thereon by moving the member 30 and pointer 6 further to the right giving an amplified movement to the pointer 6. The amount of this movement in response to a given underweight or overweight can be readily adjusted by changing the tension on springs 38 and 40, as by rotating the pins 44 and 52 and securing them in their adjusted positions by set screws 48 and 56.

In this way the pointer 6 may be caused to move through a large arc with relatively small movement of the lever 10 and therefore it is possible to reduce the height of the tower 4 and the amount of lever movement and the length of the fall of the pans in engaging abutments 20 without decreasing the sensitivity of the scale.

Furthermore by suitable adjustment of the tension springs 38 and 40 it is possible to cause the pointer 6 to move further to one side than to the other in response to a given over or underweight. When adjusted in this manner, the scale 9 may be calibrated so that each of the graduations on the left or underweight side of the zero position indicate a large weight, say ounces, whereas the graduations on the right or overweight side of the scale may indicate a smaller weight, say quarter ounces. This is desirable in the use of the scale with automatic filling devices wherein a warning is given or the flow of material is reduced as the pointer approaches its zero position from the underweight side so that zero is approached slowly, whereas the overweight limit in filling the receptacle may be small and overweight indications are therefore preferably large. When using the present invention with mechanism of this type, greater tension may be placed on one spring, say spring 40, than on the other. The amount of tensioning of the spring 40 on movement of the pointer to the right is less than on movement to the left from center and therefore the resistance imposed upon the movement of the pointer to the right in Figures 1 and 5 indicating the overweight is less than is the resistance to the movement of the pointer to the left, indicating underweight. If then spring 40 is under greater tension than spring 38, the pointer 6 will be moved further to the right with an ounce of overweight than it will be moved to the left by an ounce of underweight.

Other suitable adjustments may also be made by rotation of the pins 44 and 52 to increase or decrease the tension on both springs to render the scale either more or less sensitive so that the arc through which the pointer moves with a given deflection of the lever 10 will be varied to suit any particular operating conditions.

The pointer may, if desired, be equipped with a stabilizer in the form of inertia dampening means which as shown comprises a housing 60 on the pointer carrying member 30 positioned concentric with the bearing 26. Within the housing 60 is located a ball 62 of smaller diameter than the housing and free to roll therein upon movement of the pointer. The housing may be filled with a suitable liquid such as oil, mercury or the like, so that movement of the ball and of the liquid within the housing will be retarded but not prevented.

The construction illustrated is not only compact and simple but the springs or resisting elements 38 and 40 as well as the ball bearings 28 and the stabilizer 60—62 are all carried by the member 30 so that they may be quickly and easily removed or replaced for repair or adjustment. Furthermore the small number of parts and freedom from play insure sensitivity and accuracy of operation. Moreover, all of the moving elements are mounted independently of the tower cover 4, only the chart being carried by the cover, so that the mechanism may be adjusted and calibrated or "sealed" prior to placing the cover in position by using a standard chart for adjustment. The cover carrying the chart 8 in proper position thereon may then be slipped into place and secured on the base without danger of changing the adjustment of the parts or throwing them out of "seal".

The form of the springs 38 and 40 employed may be varied as desired but a spiral type of spring as shown is preferred since the distortion of the spring is small and the graduations on the scale 8 may be made uniform within the limits of operation of the mechanism. Furthermore, by locating the spring means so that they act upon the pointer carrying member 30 in substantially horizontal alignment the strain placed on the bearing 26 is reduced and a ball or other antifriction bearing of simple construction can be substituted for the conventional knife and block support without decreasing the sensitivity of the scale.

The spacing or relative positions of the pins 44 and 52 with respect to the bearing 26 about which the pointer moves influences the arc through which the pointer moves with a given deflection of the lever 10. Therefore, suitable adjustments or changes in construction and relation of the elements described may be made to adapt the mechanism for use on scales of different types. Furthermore, the position of the tower and the direction of movement of the indicator 6 may be varied as desired. The pointer may extend from its bearing in either a vertical or horizontal position and it may move in a plane either parallel to or at right angles to the lever 10 by the use of suitable or conventional connections between the arms 22 and the lever 10.

Such changes in the construction and arrangement of the mechanism embodying the present invention are contemplated and therefore are included within the scope of the invention. Moreover, while the invention has been herein described with particular reference to its use in a scale of the underweight-overweight type, it will be evident that the operating means for the indicator may be employed in other types of scales and in other types of apparatus or measuring instruments wherein a pointer is movable over a scale. It should therefore be understood that the form of the invention herein shown and described is intended to be illustrative and is not intended to limit the scope of the invention.

I claim:

1. An instrument comprising a pointer carrying member having a bearing about which it is movable, a pointer carried by said member, a chart cooperating with said pointer, an operating arm having a bearing about which it is movable, opposed resisting elements acting on said pointer carrying member and arm tending to hold the pointer carrying member and arm in zero positions, means connecting said resisting elements to said arm, said resisting elements and the bearings for said pointer carrying member and arm being so arranged that movement of said arm away from said zero position tends to displace the connecting means for one of said resisting elements a greater distance with respect to the bearing for said pointer carrying member than it displaces the connecting means for the other resisting element, said pointer carrying member being movable by said resisting elements to equalize the force exerted by said elements on said pointer carrying member and arm, whereby the movement of said pointer carrying member is amplified.

2. An instrument comprising a pointer carrying member having a bearing about which it is movable, a pointer carried by said member, a chart cooperating with said pointer, an operating arm having a bearing about which it is movable, opposed springs interposed between said pointer carrying member and arm tending to hold the pointer carrying member and arm in zero positions, means connecting said springs to said arm, said springs and the bearings for said pointer carrying member and arm being so arranged that movement of said arm away from said zero position tends to displace the connecting means for one of said springs a greater distance with respect to the bearing for said pointer carrying member than it displaces the connecting means for the other spring, said pointer carrying member being movable by said springs to equalize the force exerted by said springs on said pointer carrying member and arm, whereby the movement of said pointer carrying member is amplified.

3. An instrument comprising a pointer carrying member having a bearing about which it is movable, a pointer carried by said member, a chart cooperating with said pointer, an operating arm having a bearing about which it is movable and oppositely wound spiral springs connected to said pointer carrying member and arm tending to hold the pointer carrying member and arm in zero positions, means connecting said springs to said arm, said springs and the bearings for said pointer carrying member and arm being so arranged that movement of said arm away from said zero position tends to displace the connecting means for one of said springs a greater distance with respect to the bearing for said pointer carrying member than it displaces the connecting means for the other spring, said pointer carrying member being movable by said springs to equalize the force exerted by said springs on said pointer carrying member and arm, whereby the movement of said pointer carrying member is amplified.

4. An instrument comprising a pointer actuating member having a bearing about which it is movable, operating means for moving said pointer actuating member, and opposed resisting elements interposed between said pointer actuating member and said operating means, said resisting elements being bodily movable with the pointer actuating member about the bearing for said member.

5. An instrument comprising a pointer carrying member having a bearing about which it is movable, a pointer carried by said member, a chart cooperating with said pointer, an operating arm having a bearing about which it is movable, opposed resisting elements acting on said pointer carrying member and arm tending to hold the pointer carrying member and arm in zero positions, means connecting said resisting elements to said arm, said resisting elements and the bearings for said pointer carrying member and arm being so arranged that movement of said arm away from said zero position tends to displace the connecting means for one of said resisting elements a greater distance with respect to the bearing for said pointer carrying member than it displaces the connecting means for the other resisting element, said pointer carrying member being movable by said resisting elements to equalize the force exerted by said elements on said pointer carrying member and arm, whereby the movement of said pointer is amplified, and inertia means actuated by movement of said pointer carrying member to dampen movement thereof.

6. An overweight-underweight scale comprising a pivoted lever, a pointer carrying member having a bearing about which it is movable, a pointer carried by said member, a chart cooperating with said pointer for giving an indication of the movement of the lever, an arm actuated by the lever and having a bearing about which it is movable, and resisting elements interposed between the arm and pointer carrying member tending to retain the arm and pointer carrying member in zero positions, means connecting said resisting elements to said arm, said resisting elements and the bearings for the arm and pointer carrying member being so arranged that movement of said arm away from said zero position tends to displace the connecting means for one of said resisting elements a greater distance with respect to the bearing for said pointer carrying member than it displaces the connecting means for the other resisting element, said pointer carrying member being movable by said resisting elements to equalize the force exerted by said elements on said pointer carrying member and arm, whereby the movement of said pointer is amplified.

7. An overweight-underweight scale comprising a pivoted lever, a pointer carrying member having a bearing about which it is movable, a pointer carried by said member, a chart cooperating with said pointer for giving an indication of the movement of the lever, an arm actuated by the lever and having a bearing about which it is movable, and oppositely wound spiral springs interposed betwen the arm and pointer carrying member tending to retain the arm and pointer in zero positions, means connecting said spiral springs to said arm, said springs and the bearings for the arm and pointer carrying member being so arranged that movement of said arm away from said zero position tends to displace the connecting means for one of said springs a greater distance with respect to the bearing for said pointer carrying member than it displaces the connecting means for the other spring, said pointer carrying member being movable by said springs to equalize the force exerted by said springs on said pointer carrying member and arm, whereby the movement of said pointer is amplified.

8. An overweight-underweight scale comprising a pivoted lever, a pointer carrying member having a bearing about which it is movable, a pointer carried by said member, a chart cooperating with said pointer for giving an indication of the movement of the lever, an arm actuated by the lever and having a bearing about which it is movable, oppositely wound spiral springs interposed between the arm and pointer carrying member tending to retain the arm and pointer carrying member in zero positions, means connecting said spiral springs to said arm, said springs and the bearings for the arm and pointer carrying member being so arranged that movement of said arm away from said zero position tends to displace the connecting means for one of said springs a greater distance with respect to the bearing for said pointer carrying member than it displaces the connecting means for the other spring, said pointer carrying member being movable by said springs to equalize the force exerted by said springs on said pointer carrying member and arm, whereby the movement of said pointer is amplified, and means adjustable independently for varying the tension on each of said springs.

9. An overweight-underweight scale comprising scale pans, a lever movable by said scale pans and supported on a bearing, a pointer carrying member having a bearing about which it is movable located in spaced relation to said lever bearing, an arm extending from said lever to a point adjacent said pointer carrying member bearing, springs connected to said arm and to said pointer carrying member in opposed relation on opposite sides of said bearing and adjacent thereto whereby said arm tends to move said springs in an arc of relatively long radius and said pointer carrying member tends to move said springs in an arc of relatively small radius, said pointer carrying member being movable by said springs to equalize the tension thereon.

10. An overweight-underweight scale comprising scale pans, a lever movable by said scale pans and supported on a bearing, a pointer carrying member having a bearing about which it is movable located in spaced relation to said lever bearing, an arm extending from said lever to a point adjacent said pointer carrying member bearing, springs connected to said arm and to said pointer carrying member in opposed relation on opposite sides of said bearing and adjacent thereto whereby said arm tends to move said springs in an arc of relatively long radius and said pointer carrying member tends to move said springs in an arc of relatively small radius, said pointer carrying member being movable by said springs to equalize the tension thereon and means for adjusting the tension on said springs to urge said pointer carrying member toward a zero position.

11. An overweight-underweight scale having a scale pan, a lever movable by said pan, an arm movable about a bearing by said lever, a pointer carrying member movable about a bearing spaced from the bearing about which said arm is moved and oppositely coiled spiral springs located on opposite side of said pointer carrying member bearing and connected between said arm and pointer at points thereon adjacent said pointer carrying member bearing.

12. An overweight-underweight scale having a scale pan, a lever movable by said pan about a bearing, a pointer mounted for movement about a bearing spaced from said lever bearing, an arm extending from said lever to a point adjacent said pointer bearing, pins mounted on said arm on opposite sides of said pointer bearing, oppositely coiled spiral springs having their ends connected to opposite sides of said pointer and to said pins and means for retaining said pins in adjusted positions on said arm.

13. A scale comprising a lever movable on a support, a pointer actuating member having a bearing about which it is movable, operating means actuated upon movement of said lever for moving said pointer actuating member and opposed springs interposed between said pointer actuating member and said operating means, said springs being bodily movable with said pointer actuating member about the bearing for said member.

14. An overweight-underweight scale comprising a scale pan, a lever actuated by movement of the scale pan, a pointer actuating member having a bearing about which it is rotatable, operating means actuated by said lever and oppositely coiled spiral springs connected to said operating means and said pointer actuating member bodily movable with said member about said bearing.

15. In an overweight-underweight scale, a pointer actuating member, a bearing about which said member is rotatable, opposed springs secured to said member and movable therewith about said bearing and stabilizing means for damping movement of said pointer actuating member by said opposed springs, carried by said member and movable in a path concentric with said bearing.

16. In a weighing scale, in combination, a frame, weighing mechanism including a weight supporting member movable under the influence of unbalanced load applied to said weighing mechanism, an indicator pivoted to said frame to swing about a fixed axis, and resilient motion resisting means fixedly and nonpivotally secured to said weight supporting member and resisting motion thereof, said resilient motion resisting means being also fixedly and nonpivotally secured to said indicator, the connection from said weight supporting member through said motion resisting means to said indicator thus operating without frictional relative movement of parts or lost motion and acting to move said indicator upon movement of said weight supporting member.

17. In a weighing scale, in combination, a frame, weighing mechanism including a weight supporting member movable under the influence of unbalanced load applied to said weighing mechanism, an indicator pivoted to said frame to swing about a fixed axis, and resilient motion resisting means fixedly and nonpivotally secured to a rigid portion of said weight supporting member and resisting motion thereof, said resilient motion resisting means being also fixedly and nonpivotally secured to said indicator, the connection from said weight supporting member through said motion resisting means to said indicator thus operating without frictional relative movement of parts or lost motion and acting to impart amplified movement to said indicator upon movement of said weight supporting member.

HERMAN D. RIDGE.